(12) United States Patent
Woollen

(10) Patent No.: US 8,020,171 B2
(45) Date of Patent: *Sep. 13, 2011

(54) SYSTEM AND METHOD FOR CREATING AND DEPLOYING APPLICATIONS WITH NEW CONTAINER TYPES

(75) Inventor: Rob Woollen, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 773 days.

This patent is subject to a terminal disclaimer.

(21) Appl. No.: 12/056,536

(22) Filed: Mar. 27, 2008

(65) Prior Publication Data

US 2008/0178174 A1    Jul. 24, 2008

Related U.S. Application Data

(63) Continuation of application No. 10/961,304, filed on Oct. 8, 2004, now Pat. No. 7,428,733.

(60) Provisional application No. 60/570,953, filed on May 13, 2004.

(51) Int. Cl.
G06F 9/445    (2006.01)
G06F 9/54     (2006.01)
G06F 9/46     (2006.01)

(52) U.S. Cl. .................. 719/315; 719/316; 717/177

(58) Field of Classification Search .................. None
See application file for complete search history.

(56) References Cited

U.S. PATENT DOCUMENTS

| | | |
|---|---|---|
| 5,835,777 A | 11/1998 | Staelin |
| 5,911,071 A | 6/1999 | Jordan |
| 6,106,570 A | 8/2000 | Mizuhara |
| 6,128,647 A | 10/2000 | Haury |
| 6,529,992 B1 | 3/2003 | Thomas |
| 6,564,234 B2 | 5/2003 | Bamford et al. |
| 6,721,777 B1 | 4/2004 | Sharma |
| 6,738,789 B2 | 5/2004 | Multer et al. |
| 6,751,797 B1 | 6/2004 | Desgranges et al. |
| 6,766,324 B2 | 7/2004 | Carlson et al. |
| 6,779,002 B1 | 8/2004 | Mwaura |
| 6,829,575 B2 | 12/2004 | Freund et al. |
| 6,892,382 B1 | 5/2005 | Hapner et al. |
| 6,922,695 B2 | 7/2005 | Skufca et al. |
| 6,934,532 B2 | 8/2005 | Coppinger et al. |
| 6,970,924 B1 | 11/2005 | Chu |
| 6,976,061 B1 | 12/2005 | Sharma |
| 7,069,553 B2 | 6/2006 | Narayanaswamy |
| 7,086,065 B1 | 8/2006 | Yeluripati et al. |
| 7,107,592 B2 | 9/2006 | Taylor |
| 7,127,713 B2 | 10/2006 | Davis et al. |

(Continued)

OTHER PUBLICATIONS

Christopher K. Hess et al., "An Adaptive Data Object Service for Pervasive Computing Environments," Dec. 4, 2000, pp. 1-27.*

(Continued)

*Primary Examiner* — H. S. Sough
*Assistant Examiner* — Kimberly Jordan
(74) *Attorney, Agent, or Firm* — Fliesler Meyer LLP

(57) ABSTRACT

In accordance with one embodiment of the present invention applications are configured with custom modules. A deployment descriptor of an application includes a definition for a new container type and modules of the new container type. A deployment system reads the deployment descriptor and implements the modules of the new container type. The new containers are then available to assist in the deployment of the application.

18 Claims, 6 Drawing Sheets

U.S. PATENT DOCUMENTS

| | | |
|---|---|---|
| 7,185,071 B2 | 2/2007 | Berg et al. |
| 7,228,541 B2 | 6/2007 | Gupton |
| 7,246,104 B2 | 7/2007 | Stickler |
| 7,302,609 B2 | 11/2007 | Matena |
| 7,509,252 B2 | 3/2009 | Cencini et al. |
| 2002/0049744 A1 | 4/2002 | Nakos |
| 2002/0078132 A1 | 6/2002 | Cullen |
| 2002/0178439 A1 | 11/2002 | Rich et al. |
| 2003/0005093 A1 | 1/2003 | Deboer |
| 2003/0093717 A1 | 5/2003 | Mason |
| 2003/0101435 A1 | 5/2003 | Takahashi et al. |
| 2003/0158919 A1 | 8/2003 | Fomenko |
| 2003/0204784 A1 | 10/2003 | Jorapur |
| 2003/0212990 A1 | 11/2003 | Brodkorb et al. |
| 2004/0068537 A1 | 4/2004 | Freund et al. |
| 2004/0068553 A1 | 4/2004 | Davis et al. |
| 2004/0068731 A1 | 4/2004 | Davis et al. |
| 2004/0088681 A1 | 5/2004 | Berg |
| 2004/0172407 A1 | 9/2004 | Arpirez Vega |
| 2004/0255294 A1 | 12/2004 | Spotwood |
| 2005/0005200 A1 | 1/2005 | Matena et al. |
| 2005/0033767 A1 | 2/2005 | Kamentz |
| 2005/0138076 A1 | 6/2005 | Seo et al. |

OTHER PUBLICATIONS

Vecellio et al., "Container Services for High Confidence Software," Jun. 10-14, 2002, Seventh International Workshop on Component-Oriented Programming.

Chappell et al., "Java Message Service," O'Reilly, Dec. 2000.

Taylor, "J2EE and Beyond: Design, Develop, and Deploy World-Class Java (TM) Software," Prentice-Hall, Dec. 23, 2002.

Guo, et al., "Developing a Distributed Scalable Java Component Server," Future Generation Computer Systems, May 24, 2001, vol. 17, Issue 8, pp. 1051-1057.

Microsoft Computer Dictionary, Fifth Edition, Microsoft Press, 2002; pp. 115, 176, 542.

Red Hat, Inc., "JBoss Enterprise Application Platform: Configuration Guide, 4.2.0, Chapter 14, EJBs on JBoss," 2007, pp. 470-472.

Written Opinion for PCT/US05/14430 dated Jul. 27, 2005.

Menci et al., "Enhancing EJB Component Model," Academy of Sciences for the Czech Republic, 2001, 11 pages.

Popovici et al., "Spontaneous Container Services," ECOOP 2003, INCS 2743, 2003, pp. 29-54.

Sun Microsystems Enterprise Java Beans (TM) Specification, Version 2.1, Final Release, Nov. 12, 2003, pp. 1-100 and 201-413.

* cited by examiner

SYSTEM AND METHOD FOR CREATING AND DEPLOYING APPLICATIONS WITH NEW CONTAINER TYPES

CLAIM OF PRIORITY

This application is a continuation of U.S. patent application Ser. No. 10/961,304 entitled "System and Method for Custom Module Creation and Deployment" by Rob Woolen, filed Oct. 8, 2004, which claims the benefit of U.S. Provisional Patent Application No. 60/570,953 filed May 13, 2004, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to systems, methods, and machine readable media for creating and deploying applications in the Java operating system. More specifically, it relates to creating and deploying applications with new container types.

BACKGROUND OF THE INVENTION

Since its inception in 1995, the Java programming language has become increasingly popular. Java, which is an interpreted language, enabled the creation of applications which could be run on a wide variety of platforms. This ability to function across a variety of different client platforms and Java's relatively easy implementation of network applications has resulted in its use in endeavors as basic as personal web pages to endeavors as complex as large business-to-business enterprise systems.

As Java has become more commonplace, a wide variety of tools and development platforms have been created to assist developers in the creation and implementation of Java applications. These platforms allow users to work with previously generated modules, thus reducing overlapped efforts.

While the conveniences provided by these platforms have enhanced and improved the development process, they have added additional rigidity as well. Developers are often limited to modules or module types having code that was shipped with the platform. The developers are often unable to use their own container types or customized modules without significant additional effort.

DETAILED DESCRIPTION

In accordance with one embodiment of the present invention applications are configured with custom modules. A deployment descriptor of an application includes a definition for a new container type and modules of the new container type. A deployment system reads the deployment descriptor and implements the modules of the new container type. The new containers are then available to assist in the deployment of the application.

Figure 1:
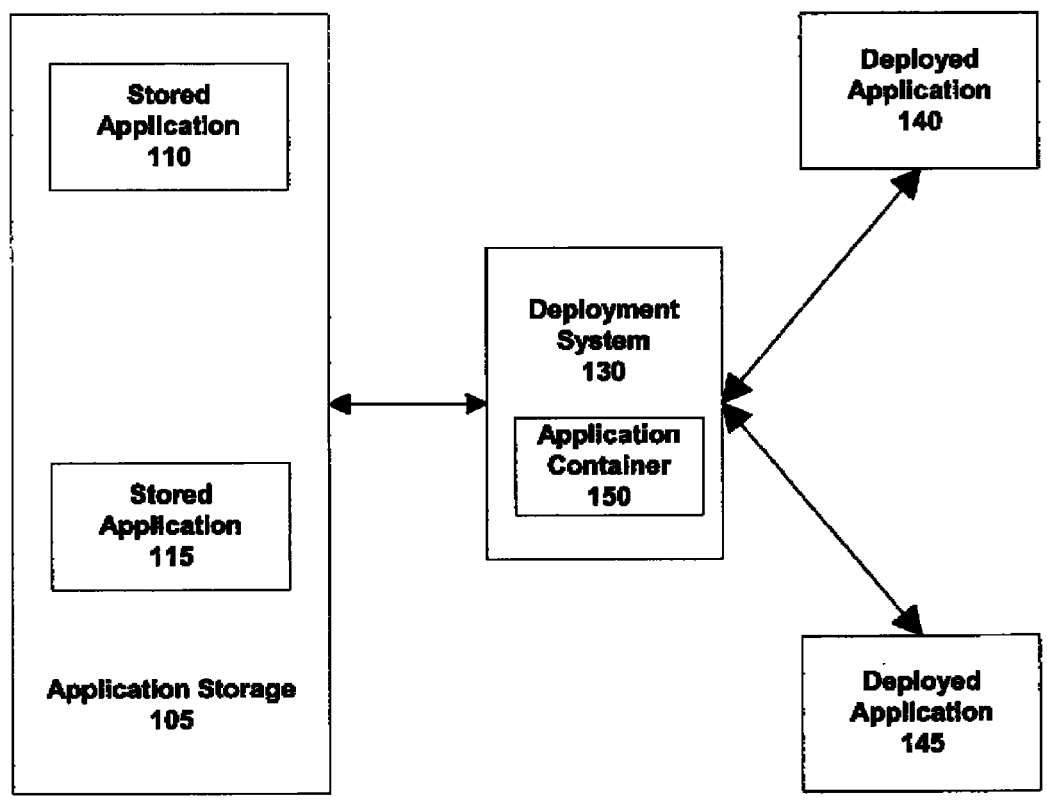
FIG. 1 illustrates an overview of an application deployment environment in accordance with one embodiment of the present invention.

FIG. 1 illustrates an overview of an application deployment environment in accordance with one embodiment of the present invention. A server storage 105 stores multiple stored applications 110, 115 previous to deployment. The applications are preferably stored as archives for deployment by a deployment system 130. In one embodiment, the applications are stored in the form of Enterprise ARchive (EAR) files. The stored applications 110, 115 include modules containing the functionality of the applications and deployment descriptors that indicate to the deployment system 130 how the applications 110, 115 should be deployed. The modules can include both conventional modules, having module types that are known to the deployment system 130, as well as custom modules including the functionality for new container types.

The deployment system 130 is responsible for deploying the stored applications 110, 115 from the server storage to generate the deployed applications 140, 145. In one embodiment, the deployment system runs when the server is started and automatically deploys a group of preselected applications. In an alternate embodiment, the deployment system allows a system administrator to manually select which applications are deployed. The deployment system checks the deployment descriptors of each of the stored applications 110, 115 to locate the modules used by the application within that application's EAR file and to deploy the application. The deployed applications are then available for use by remote clients or any party interacting with the server. In some embodiments, the deployment system includes an application container 140. The application container 140 serves as an intermediary layer between a deployment subsystem of the deployment system 130 and the containers of an application server on which the applications will be deployed. The application container performs application classloading, Java Naming and Directory Interface (JNDI), file management, and parsing of deployment descriptors.

Figure 2:
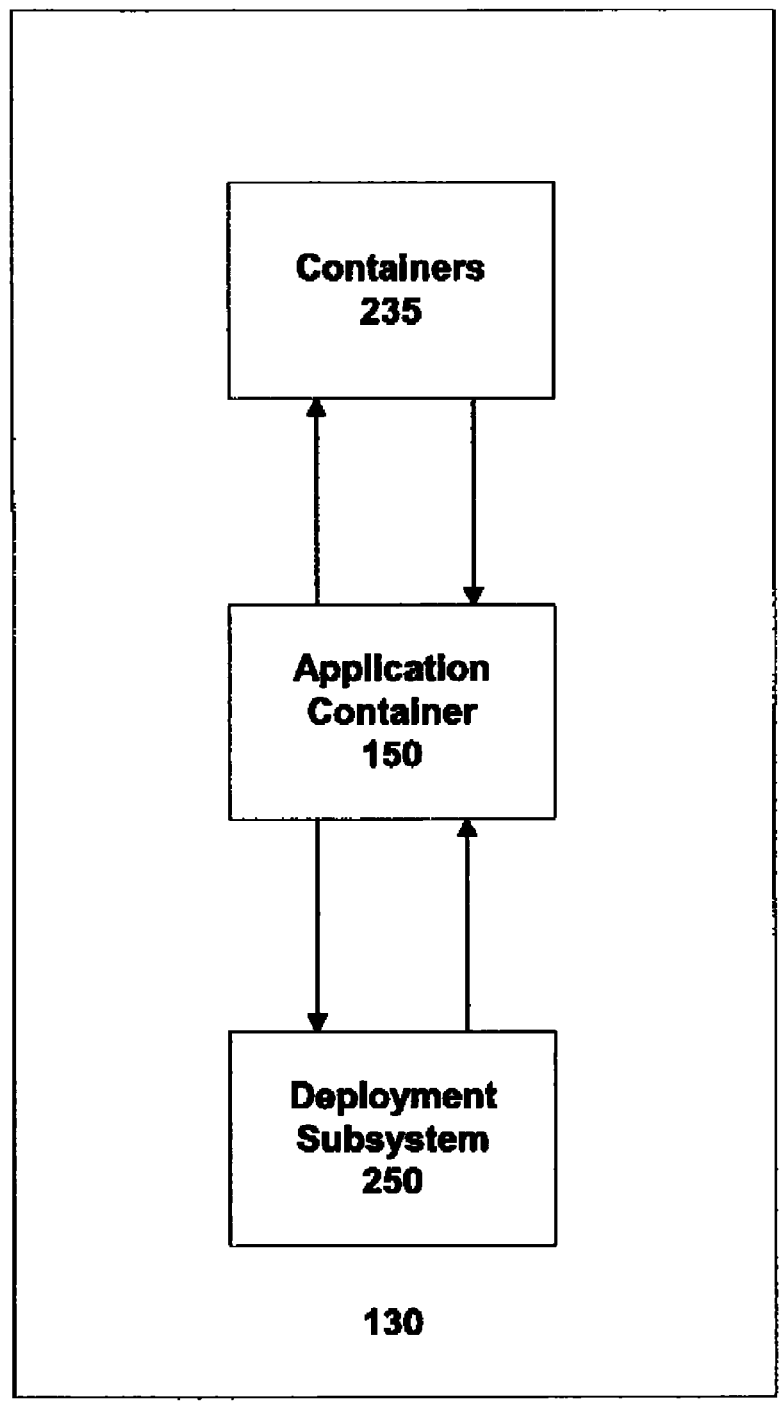
FIG. 2 illustrates a closer view of a deployment system.

FIG. 2 illustrates a closer view of a deployment system 130. The deployment system includes containers 235, the application container 150, and the deployment subsystem 250. The deployment subsystem includes functionality for extracting archived modules and loading them into system memory. The containers 235 can be standard containers that are designed to manage components such as Enterprise Java Beans (EJBs) or connectors, or custom containers generated through custom modules. The application container 150 defines the interface through which the containers 235 interface with the deployment subsystem. This interface can be extended through custom modules stored within applications. The application container 150 includes a state machine and performs application classloading and JNDI services.

The containers 235 are modules running on the application server on which the applications are to be deployed. The containers 235 provide runtime support and deployment assistance for components such as EJBs, JSPs, and servlets. The application container 150 interacts with the containers 235 through a standardized interface which allows the application container to recognize and deploy modules of previously defined types.

The containers may be implemented through the server's original configuration. Alternately, the containers may be implemented through custom modules stored within an application. For example, an application can be configured with custom modules containing code for new container types. The deployment system can, upon reading the deployment descriptor of the application detect the presence of a new container, and implement the new container. The new container is then available for use in deploying the application.

The containers implement a ModuleFactory for each container type, the ModuleFactory configured to return instances of its associated module. The application container, when parsing a deployment descriptor, detects a call for a module of a particular type and returns an instance of that module.

Figure 3:
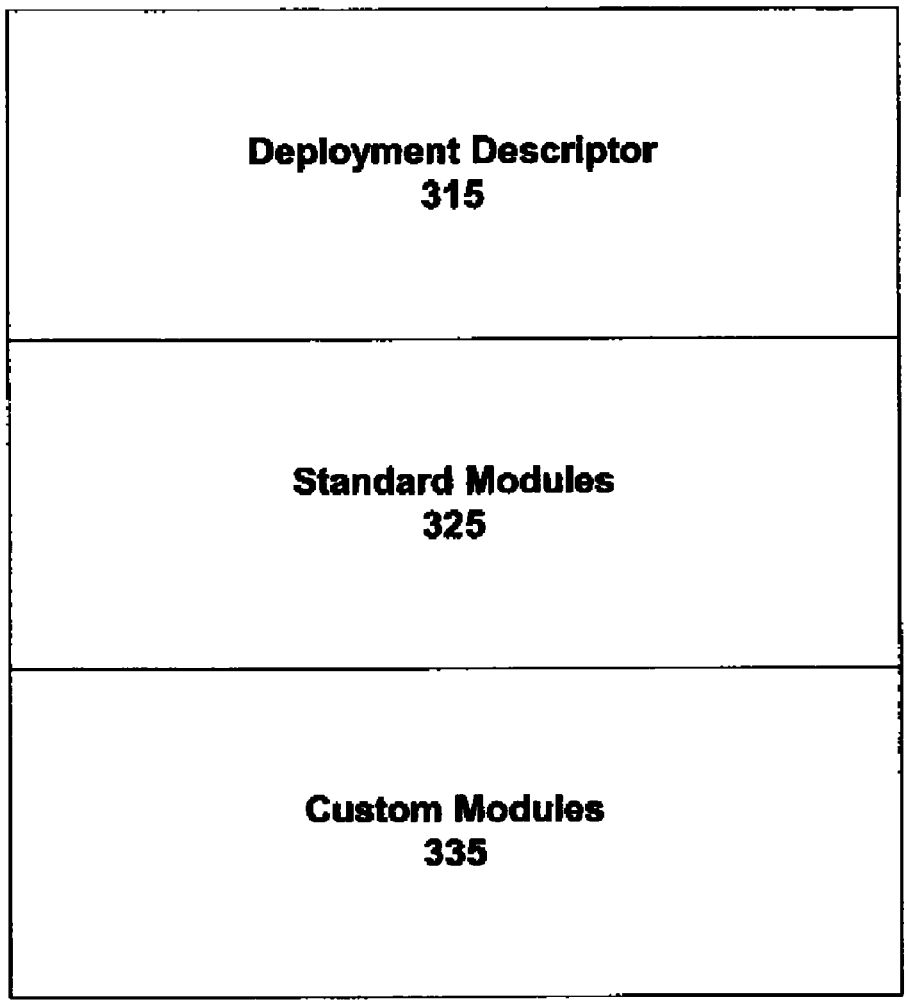
FIG. 3 illustrates a closer view of an application in accordance with one embodiment of the present invention.

FIG. 3 illustrates a closer view of a stored application in accordance with one embodiment of the present invention. The application is configured to be extracted by a deployment system 130 and to be deployed on a server. The stored application includes a deployment descriptor 315, standard modules 325, and custom modules 335. The deployment descriptor 315 identifies the application, the modules within the application, and any special or distinct characteristics of the application. The deployment descriptor can include an application.xml file, weblogic-application.xml file, a weblogic-extension.xml file, or any other manner of descriptor. The deployment descriptor additionally includes declarations of any new module types that an application developer has created.

The application additionally includes standard modules 325. The standard modules 325 are program units that provide the functionality for the application. The modules 325 can be common modules such as libraries, administrative web applications, Enterprise Java Beans (EJBs), Java Messaging System (JMS) modules, Java DataBase Connectivity (JDBC) modules, or any other modules that might be made available for the application. These modules 325 are supported by the server as originally configured and do not require separate declarations of their module types.

The custom modules 335 are modules associated with newly created container types which have been created for use in the application 105. The new types of custom modules are declared in the deployment descriptor 315. The application container 150 detects the declarations when parsing the deployment descriptor and configures itself to allow the deployment of modules of the new container type. The modules 335 contain the code for implementing the new container types declared in the deployment descriptor and once deployed are available, as the new containers, to assist in the deployment of the remainder of the application.

Figure 4:
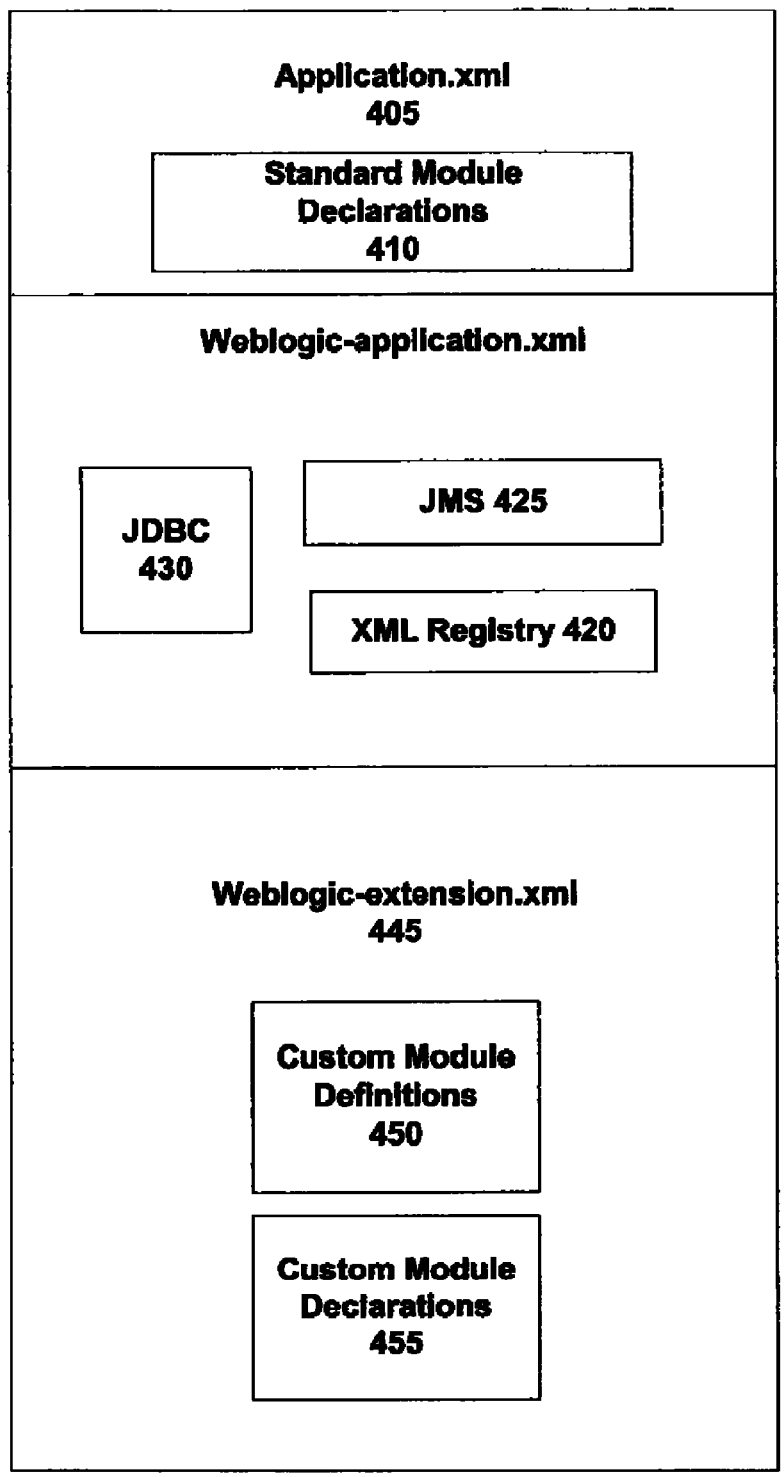
FIG. 4 illustrates a closer view of a deployment descriptor of an application in accordance with one embodiment of the present invention.

FIG. 4 illustrates a closer view of a deployment descriptor 315 of an application in accordance with one embodiment of the present invention. The deployment descriptor 315 identifies the application, the modules within the application, and any special or distinct characteristics of the application. The deployment descriptor includes an application.xml file 405. The application.xml file 405 includes standard module declarations 410. The application.xml file 405 additionally includes information necessary for representing the application in different GUI tools and other basic information for identifying and deploying the application. The standard module declarations 410 include declarations for standard Java modules and their respective paths in the EAR file storing the application. The modules declared in the application.xml file include standard Java modules such as Enterprise Java Beans (EJBs), web applications, connectors, and any other standard Java modules.

The deployment descriptor 315 additionally includes weblogic-application.xml, and weblogic-extension.xml files. While in the present embodiment, these files are referred to as "weblogic-application.xml" and "weblogic-extension.xml" they can in fact have any title and broadly refer to deployment descriptor files supplementing deployment information provided in the application.xml file 405.

The weblogic-application.xml file includes platform specific deployment information. The weblogic-application.xml file includes configuration information for database access through JDBC 425 as well as JMS configuration information 430 for messaging within the application as well with other applications. The JMS configuration 425 and JDBC configuration can be general or server specific configuration information. The weblogic-application.xml deployment descriptor additionally includes an XML registry 420 indicating the parameters for XML interaction between the application and other components.

Additionally, the weblogic-application.xml file can include a module deployment order specifying the order in which modules are deployed. If no module deployment order appears in the weblogic-application.xml file, the modules are deployed according to a previously set default order.

The weblogic-extension.xml file 445 includes custom module definitions 450 and custom module declarations 455. The custom module definitions 450 indicate a new container type and a module class and module factory class for the custom module. The custom module declarations 455 include instances of the new container type within the application. Each of the declarations 455 makes reference to the new container type defined in the custom module definitions 450. Shown below is one embodiment of a weblogic-extension.xml file in which a container type is defined and two instances of the container are declared.

```
<module-provider>
<name> PortalModule </name>
<module-class> com.bea.portal.PortalModule</module-class>
<module-factor-class>com.bea.PortalModuleFactory</module-factory-class>
<module>
<uri>MyPortal.xml</uri>
<provider-name>PortalModule </provider-name>
</module>
<module>
<uri> AnotherPortal.xml <uri>
<provider-name> PortalModule </provider-name>
</module>
```

Figure 5:
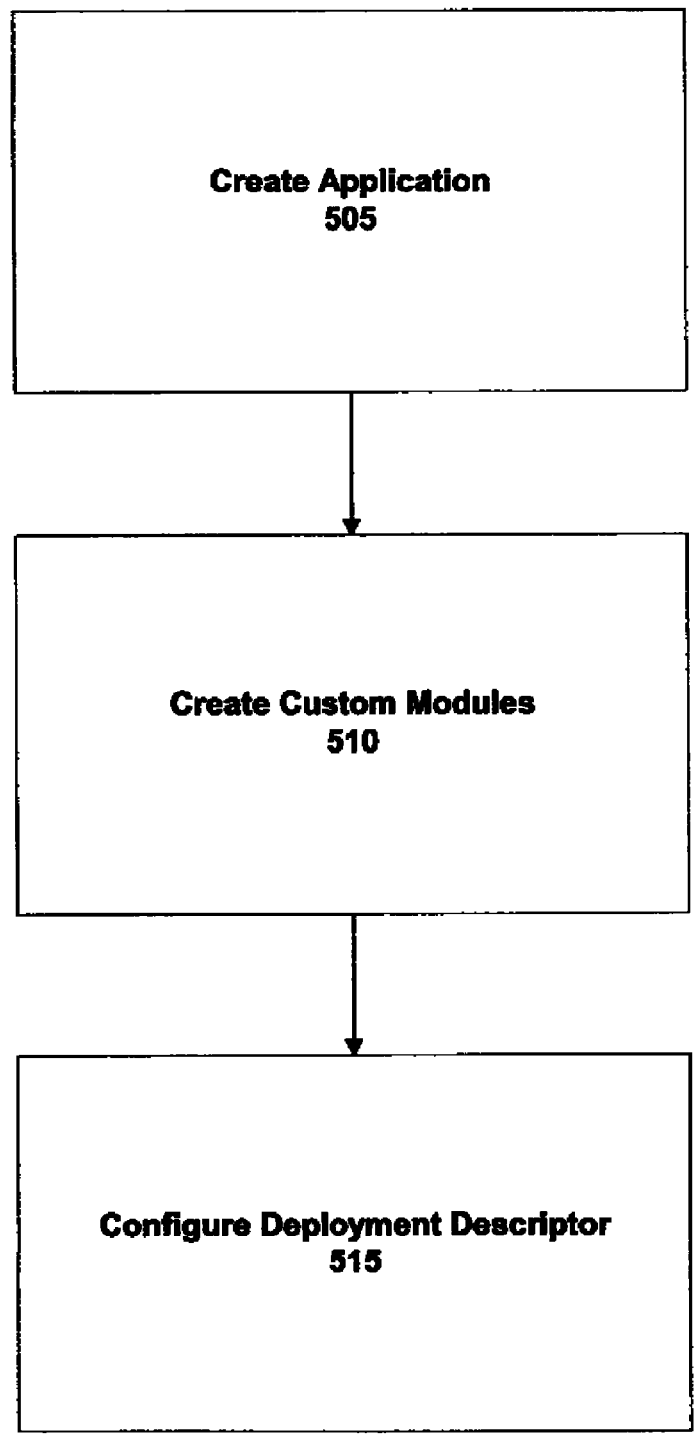
FIG. 5 illustrates a process for creating an application with custom modules in accordance with one embodiment of the present invention.

FIG. 5 illustrates a process for creating an application with custom modules in accordance with one embodiment of the present invention. The process begins in step 505, with an application being created. The creation of the application entails the generation of the various modules and descriptors which execute the functionality of the application.

In step 510, the custom modules are created. The custom modules include code for implementing new container types that are defined in the deployment descriptors. The custom modules include interface components governing how the modules interact with the application container 150. The custom modules are then stored within the archive file storing the application.

In step 515, the deployment descriptors are configured. The deployment descriptors include application.xml and weblogic.application.xml extension files that include declarations for the various standard modules that are stored within the application. The deployment descriptors may additionally include a deployment order for the modules.

Figure 6:
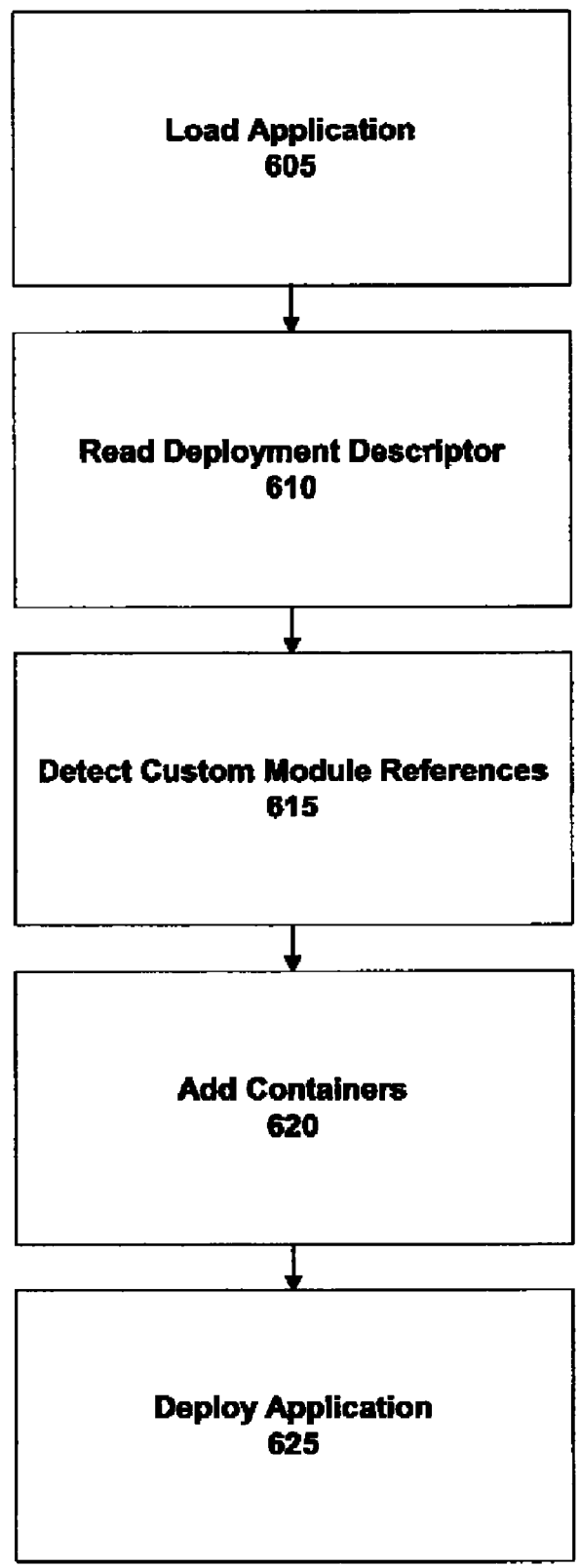
FIG. 6 illustrates a process for deploying an application with custom modules in accordance with one embodiment of the present invention.

FIG. 6 illustrates a process for deploying an application with custom modules in accordance with one embodiment of the present invention. In step 605 the deployment system reads the archive file storing the application. The archive file is stored on a storage of the server. The deployment system then reads the deployment descriptor of the application in step 610. The deployment system parses the deployment descriptor and gathers the locations of the various modules stored within the application so that they can be accessed during deployment.

In step 615, the deployment system reads the deployment descriptor and detects references to the custom modules within the deployment descriptor. The deployment descriptor includes a definition of the new container type and instances of the new container in the application.

In step 620, the deployment system implements the new containers for use with the server. The new containers are included among the containers 235 illustrated in FIG. 2. The containers are at this point available to provide deployment and runtime services for the application. In step 625, the deployment system deploys the other modules within the application. The new containers assist in the deployment of the remainder of the application and are available to be utilized by the application once deployed.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention.

The invention claimed is:

1. A method for deploying an application on a server, comprising:

storing in a deployment descriptor for the application one or more module definitions and one or more module declarations, wherein the one or more module definitions indicate a new container type, and wherein the one or more module declarations reference code for implementing an instance of the new container type defined in the deployment descriptor, and wherein the instance of the new container type is not among a plurality of container types associated with the server as originally configured;

storing in an archive file on a computer readable storage medium the application, the deployment descriptor, and one or more modules supported by the server as originally configured;

parsing the archive file of the application;

creating one or more containers for the one or more modules supported by the server as originally configured, and one or more new container type instances for the one or more module definitions using the code referenced in the one or more module declarations;

deploying the one or more modules supported by the server as originally configured into the one or more module's respective containers, and the one or more module definitions associated with the new container type into the one or more module definition's respective new container type instance; and wherein the new container type instance is available to be utilized by the application.

2. The method of claim 1, wherein the definition for the new container type indicates a module class and module factory class.

3. The method of claim 1, wherein the one or more module declarations describe one or more instances of the new container type within the application.

4. The method of claim 1, wherein the one or more modules associated with the new container type include code for implementing the new container type defined in the deployment descriptor.

5. The method of claim 1, wherein the deployment descriptor is an eXtensible Markup Language (XML) file.

6. The method of claim 1, further comprising configuring the one or more modules associated with the new container type to assist in a deployment of the application.

7. The method of claim 1, wherein the application is a web application.

8. The method of claim 1, wherein the deployment descriptor includes a module deployment order specifying the order in which the one or more modules are deployed.

9. The method of claim 1, wherein the one or more modules include interface components governing how the one or more modules interact.

10. A non-transitory computer-readable storage medium, storing instructions for deploying an application on a server, the instructions comprising:

storing in a deployment descriptor for the application one or more module definitions and one or more module declarations, wherein the one or more module definitions indicate a new container type, and wherein the one or more module declarations reference code for implementing an instance of the new container type defined in the deployment descriptor, and wherein the instance of the new container type is not among a plurality of container types associated with the server as originally configured;

storing in an archive file on a computer readable storage medium the application, the deployment descriptor, and one or more modules supported by the server as originally configured;

parsing the archive file of the application;

creating one or more containers for the one or more modules supported by the server as originally configured, and one or more new container type instances for the one or more module definitions using the code referenced in the one or more module declarations;

deploying the one or more modules supported by the server as originally configured into the one or more module's respective containers, and the one or more module definitions associated with the new container type into the one or more module definition's respective new container type instance; and wherein the new container type instance is available to be utilized by the application.

11. The non-transitory computer-readable storage medium of claim 10, wherein the definition for the new container type indicates a module class and module factory class.

12. The non-transitory computer-readable storage medium of claim 10, wherein the one or more module declarations describe one or more instances of the new container type within the application.

13. The non-transitory computer-readable storage medium of claim 10, wherein the one or more modules associated with the new container type include code for implementing the new container type defined in the deployment descriptor.

14. The non-transitory computer-readable storage medium of claim 10, wherein the deployment descriptor is an eXtensible Markup Language (XML) file.

15. The non-transitory computer-readable storage medium of claim 10, further comprising configuring the one or more modules associated with the new container type to assist in a deployment of the application.

16. The non-transitory computer-readable storage medium of claim 10, wherein the application is a web application.

17. The non-transitory computer-readable storage medium of claim 10, wherein the deployment descriptor includes a module deployment order specifying the order in which the one or more modules are deployed.

18. The non-transitory computer-readable storage medium of claim 10, wherein the one or more modules include interface components governing how the one or more modules interact.

\* \* \* \* \*

UNITED STATES PATENT AND TRADEMARK OFFICE
CERTIFICATE OF CORRECTION

| | | |
|---|---|---|
| PATENT NO. | : 8,020,171 B2 | Page 1 of 1 |
| APPLICATION NO. | : 12/056536 | |
| DATED | : September 13, 2011 | |
| INVENTOR(S) | : Woollen | |

It is certified that error appears in the above-identified patent and that said Letters Patent is hereby corrected as shown below:

In column 1, line 9, delete "Rob Woolen," and insert -- Rob Woollen, --, therefor.

Signed and Sealed this
Sixth Day of December, 2011

David J. Kappos
*Director of the United States Patent and Trademark Office*